United States Patent
Kanso et al.

(10) Patent No.: US 9,292,278 B2
(45) Date of Patent: Mar. 22, 2016

(54) PROVIDING HIGH AVAILABILITY FOR STATE-AWARE APPLICATIONS

(71) Applicants: Ali Kanso, Elmsford, NY (US); Yves Lemieux, Kirkland (CA)

(72) Inventors: Ali Kanso, Elmsford, NY (US); Yves Lemieux, Kirkland (CA)

(73) Assignee: TELEFONAKTIEBOLAGET ERICSSON LM (PUBL), Stockholm (SE)

( * ) Notice: Subject to any disclaimer, the term of this patent is extended or adjusted under 35 U.S.C. 154(b) by 314 days.

(21) Appl. No.: 14/044,206

(22) Filed: Oct. 2, 2013

(65) Prior Publication Data

US 2014/0245077 A1    Aug. 28, 2014

Related U.S. Application Data

(60) Provisional application No. 61/768,003, filed on Feb. 22, 2013.

(51) Int. Cl.
   *G06F 9/44*    (2006.01)
   *G06F 11/14*   (2006.01)
   *G06F 11/20*   (2006.01)

(52) U.S. Cl.
   CPC .............. *G06F 8/70* (2013.01); *G06F 11/1482* (2013.01); *G06F 11/2035* (2013.01)

(58) Field of Classification Search
   CPC .... G06F 11/1471; G06F 11/1482; G06F 8/70
   See application file for complete search history.

(56) References Cited

U.S. PATENT DOCUMENTS

| | | | |
|---|---|---|---|
| 6,854,069 B2 * | 2/2005 | Kampe ............... | H04L 12/2602 714/4.12 |
| 7,788,521 B1 * | 8/2010 | Sim-Tang ........... | G06F 11/1471 714/20 |
| 8,006,130 B2 | 8/2011 | Kanso et al. | |
| 8,095,826 B1 * | 1/2012 | Deolasee ............ | G06F 11/1471 714/15 |
| 8,589,727 B1 * | 11/2013 | Fletcher ............. | G06F 11/3006 714/13 |

(Continued)

FOREIGN PATENT DOCUMENTS

WO    2011018724 A1    2/2011

OTHER PUBLICATIONS

PCT International Search Report from corresponding application PCT/IB2014/058920.

(Continued)

*Primary Examiner* — Loan L. T. Truong
(74) *Attorney, Agent, or Firm* — Ericsson Canada Inc.

(57) ABSTRACT

A middleware that manages high availability of a software application is automatically configured when the software application is added to a system. The method of automatic configuration includes receiving a user input that specifies availability requirements and information of the software application, where the availability requirements include at least a checkpoint service that enables the software application to save and retrieve its state. The method also includes identifying a checkpoint agent for providing the checkpoint service to the software application. The checkpoint agent includes a first interface to the software application and a second interface, different from the first interface, to the middleware. A middleware configuration is generated that satisfies the availability requirements, based on the information of the software application such that the middleware offers the checkpoint service to the software application through the checkpoint agent and directly manages lifecycles of the software application.

20 Claims, 9 Drawing Sheets

(56) References Cited

U.S. PATENT DOCUMENTS

| | | | | |
|---|---|---|---|---|
| 9,104,466 B2* | 8/2015 | Kanso | | G06F 9/46 |
| 2002/0178396 A1* | 11/2002 | Wong | | G06F 11/0709 |
| | | | | 714/4.11 |
| 2007/0174697 A1* | 7/2007 | Saridakis | | G06F 11/1471 |
| | | | | 714/19 |
| 2007/0260733 A1* | 11/2007 | Havemose | | G06F 11/1482 |
| | | | | 709/226 |
| 2008/0201338 A1* | 8/2008 | Castro | | G06F 17/3056 |
| 2009/0044186 A1* | 2/2009 | Biro | | G06F 9/541 |
| | | | | 718/1 |
| 2009/0049422 A1* | 2/2009 | Hage | | G06F 8/10 |
| | | | | 717/104 |
| 2011/0023050 A1* | 1/2011 | Strom | | G06F 9/546 |
| | | | | 719/313 |
| 2011/0119314 A1* | 5/2011 | Chatterjee | | G06F 17/30286 |
| | | | | 707/804 |
| 2011/0153834 A1* | 6/2011 | Bharrat | | G06F 11/1482 |
| | | | | 709/227 |
| 2011/0197198 A1* | 8/2011 | Kanso | | G06F 9/5083 |
| | | | | 718/105 |
| 2011/0270595 A1* | 11/2011 | Salehi | | G06Q 10/00 |
| | | | | 703/6 |
| 2012/0079081 A1* | 3/2012 | Parks | | G06F 3/1204 |
| | | | | 709/220 |
| 2012/0137173 A1* | 5/2012 | Burshan | | G06F 9/45533 |
| | | | | 714/15 |
| 2012/0204060 A1* | 8/2012 | Swift | | G06F 11/1435 |
| | | | | 714/15 |
| 2012/0324069 A1 | 12/2012 | Nori et al. | | |
| 2013/0091485 A1 | 4/2013 | Colombo et al. | | |
| 2013/0268676 A1* | 10/2013 | Martins | | H04L 67/10 |
| | | | | 709/226 |

OTHER PUBLICATIONS

Pejman, Salehi, A UML Profile for the entity types file, Concordia University and Ericsson Inc., Montreal, Canada, Jul. 2010.

Service Availability Application Interface Specification, Availability Management Framework, SAI-AIS-AMF-B.04.01, as accessed on the internet on Nov. 8, 2013: http://www.saforum.org/HOA/assn16627/images/SAI-AIS-AMF-B.04.01.pdf.

Service Availability Application Interface Specification, Software Management Framework,SAI-AIS-AMF-A.01.02, as accessed on the internet on Nov. 8, 2013: http://www.saforum.org/hoa/assn16627/images/sai-ais-smf-a.01.02.pdf.

Fielding, Roy Thomas, Representational State Transfer (RESTS), Chapter 5, as accessed on the internet on Nov. 12, 2013: http://www.ics.uci.edu/~fielding/pubs/dissertation/rest_arch_style.htm.

Pejman, Salehi, A model based framework for service availability management, Concordia University School of Graduate Studies, Montreal, Canada, Apr. 11, 2012.

* cited by examiner

UML component diagram
main constructs: 710

--→  Depends on

○—  Provides Interface

⊃—  Requires Interface

[Component]

Added Constructs: 720

Added Dependency:

⇢  Interface Colocation Dependency:

Added Interfaces:

Proxy Interface:

Container Interface:

SAF Interface:

Checkpoint Interface:

PROVIDING HIGH AVAILABILITY FOR STATE-AWARE APPLICATIONS

CROSS-REFERENCE TO RELATED APPLICATIONS

This application claims the benefit of U.S. Provisional Application No. 61/768,003, filed on Feb. 22, 2013.

TECHNICAL FIELD

Embodiments of the invention relate to availability management; and more specifically, to the use of high availability middleware for managing system availability.

BACKGROUND

The advancement in the information technology is changing the way services are being delivered, and is introducing new business models based on broadband internet access, e.g., VoIP (voice over the internet protocol). The services provided by the applications are considered highly available if they are accessible 99.999% of the time (also known as five 9's). High Availability (HA) has become a key requirement for critical applications and revenue generating applications. The Service Availability Forum (also referred to as the "SA Forum" or "SAF"), a consortium of telecom and computing companies, has defined a set of specifications that describe a middleware that manages the HA of the applications. The middleware requires a configuration that describes each of the applications it manages. Moreover, the applications that wish to interact with the middleware (e.g., to checkpoint their state) need to implement the SA Forum Application Programming Interface (API). This process requires deep knowledge of the field from the application developers, as well as from the system integrator that needs to define a complex configuration.

More specifically, the HA middleware defined by the SA Forum comprises a core that is based on the Availability Management Framework (AMF). AMF is responsible for maintaining the service availability by detecting and reacting to failures. AMF performs the availability management according to a system configuration known as the AMF configuration. The AMF configuration is a logical organization of the software components describing their dependencies, the services they provide, the recovery policy that AMF must apply in case of failure, how they are grouped, etc.

In the following, the main elements of the AMF configuration will be described. The basic building block of the AMF configuration is an AMF component (also referred to as a component), which abstracts a deployable instance of an application's component. The service(s) provided by such a component is represented by a component-service-instance. The components that collaborate closely and that must be collocated to provide a more integrated service are grouped into a service-unit. The workload assigned to the service-unit is referred to as the service-instance, which is a grouping of component-service-instances. The service-units composed of redundant component replicas form a service-group. The service availability management takes place within the service-group, i.e., the service instances are provided by service-units and protected against failures within the scope of the service-group. The AMF configuration also represents the nodes on which the components are deployed. AMF supports the notion of a redundancy model for a service-group. The redundancy model defines the redundancy scheme according to which the service-instances are protected. For instance a 2N redundancy indicates that the service-group can have one active service-unit for all the service-instances and one standby for all the service-instances. For example, a service-unit cannot simultaneously be active for some service-instances and standby for others.

Figure 1:
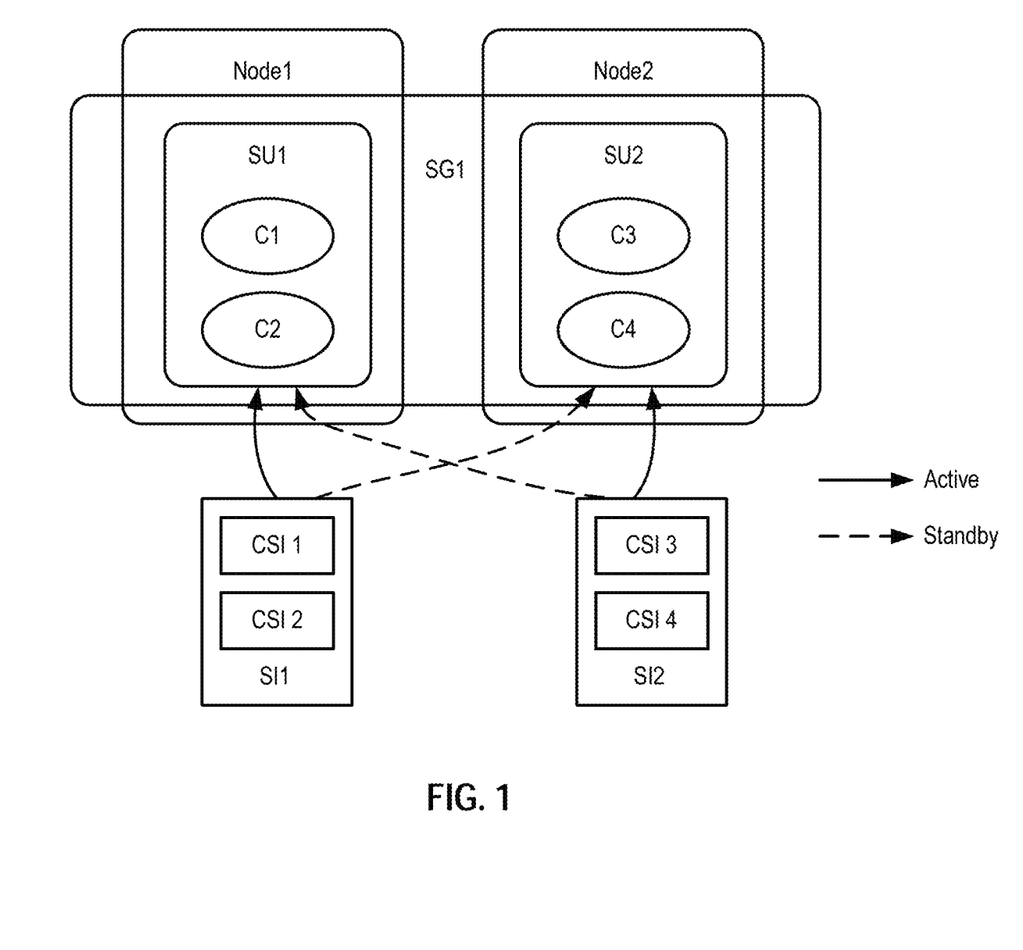
FIG. 1 illustrates an example of a middleware configuration that may be generated according one embodiment.

FIG. 1 illustrates an example AMF configuration, in which there is one service-group (SG1) with 2N redundancy. The service-group (SG1) contains two redundant service-units (SU1 and SU2), deployed on nodes Node1 and Node2, respectively. One service-unit is active and one is in standby, ready to take over if the active one fails. Each service-unit (SU1 or SU2) has two components ((C1 and C2) for SU1; (C3 and C4) for SU2). The service-group (SG1) protects two service-instances (SI1 and SI2). Each service-instance is composed of two component-service-instances ((CSI1 and CSI2) for SI1; (CSI3 and CSI4) for SI2). The AMF configuration also contains attributes that can determine the recovery executed by AMF at runtime in case a failure of a component or a service-instance is detected. All of the elements shown in FIG. 1 are represented by objects in the AMF configuration. The structure of these objects has to comply with a Unified Modeling Language (UML) class diagram. The configuration objects are described according to a standardized machine-readable eXtensible Markup Language (XML) schema. It is the responsibility of a system integrator to define the AMF configuration.

A distinction between a component and an application is explained in the following. From a software engineering perspective, an application (more specifically, the executable code of an application) can have one or more application components. From an HA perspective, each deployment (i.e., installation) of an application component is considered a distinct component. For example, a given application such as a database can be considered as one application composed of one application component (i.e., the database). However, if the database is replicated on three nodes (for redundancy), then this application is considered to have three components from an HA perspective, and thus the AMF middleware configuration would include the description of three distinct components. In the context described herein, a user describes an application from a software engineering perspective; however, once deployed and managed by the middleware, the application is viewed from an HA perspective.

An example of the services offered by the HA middleware is a checkpoint service. The checkpoint service allows the components at runtime to create checkpoint objects that can store data representing the application state. Once a checkpoint object is created, the checkpoint service makes sure that the checkpoint object is properly replicated within the cluster/computing system to avoid losing the state information in case of failure. The checkpoint service offers various modes of synchronizations between the replicated checkpoint objects (e.g., synchronous and asynchronous). One main objective behind the checkpoint service is to allow an application to have service continuity, by conserving its state in case of the application failure.

In order for a software component to interact with AMF, or other middleware services such as the checkpoint, it needs to implement the service specific APIs defined by the SA Forum specifications, i.e., the API implementation is incorporated in the code of the software component. This requires the application developers to have detailed knowledge of the APIs and the AMF architecture.

A number of approaches for managing the high availability of a software application have been proposed. The approaches generally fall into three categories. In the first category, the middleware does not offer checkpoint service to the application; thus, the application state cannot be preserved by the middleware. In the second category, the application implements the APIs required by the middleware; thus, detailed knowledge of the SA Forum specifications and the APIs is needed. In the third category, the middleware controls and communicates with the application via a proxy; thus, if the proxy fails, the middleware loses the means of communication with the application. All of these approaches have drawbacks in providing high availability for applications that need to preserve their state. Therefore, there is still a need to improve the management of high availability and service continuity of software applications.

SUMMARY

In one embodiment, a method for automatically configuring a middleware is provided to manage high availability of a software application to be added to a system. The method comprises receiving a user input that specifies availability requirements and information of the software application, where the availability requirements include at least a checkpoint service that enables the software application to save and retrieve its state. The method also comprises identifying a checkpoint agent for providing the checkpoint service to the software application. The checkpoint agent includes a first interface to the software application and a second interface, different from the first interface, to the middleware. A middleware configuration is generated that satisfies the availability requirements, based on the information of the software application such that the middleware offers the checkpoint service to the software application through the checkpoint agent and directly manages lifecycles of the software application.

In another embodiment, there is provided a computer system adapted to automatically configure a middleware that manages high availability of a software application to be added to a system. The computer system comprises a processor and a memory, the memory containing instructions executable by the processor. The computer system is operative to receive a user input that specifies availability requirements and information of the software application, where the availability requirements include at least a checkpoint service that enables the software application to save and retrieve its state. The computer system is also operative to identify a checkpoint agent for providing the checkpoint service to the software application. The checkpoint agent includes a first interface to the software application and a second interface, different from the first interface, to the middleware. A middleware configuration is generated that satisfies the availability requirements, based on the information of the software application such that the middleware offers the checkpoint service to the software application through the checkpoint agent and directly manages lifecycles of the software application.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

High availability of applications is typically managed by specialized software or middleware, e.g., the OpenSAF middleware based on the SAF specifications. The middleware monitors the applications and reacts to their failure by automatically recovering their services. The behavior of the middleware is based on its configuration. For instance, the AMF service of the middleware, which is responsible for maintaining the availability of the applications, operates based on the AMF configuration. The AMF configuration conforms to the SAF standardized models and the constraints defined in the SAF specifications. The applications managed by AMF are described in the AMF configuration.

In order to enable the service continuity of software applications, the state of the applications is to be saved in order for restoration in the case of application failure. Before going further, the notion of state-aware applications is defined. A state-aware application is a stateful application that is aware of its state, and can save and acquire this state as needed. In other words, a state-aware application not only has state, but also saves and retrieves its state as needed. By contrast, a stateless application does not keep track of what has happened since it started executing. Thus, no state information about a stateless application is maintained.

Moreover, for the simplicity of the discussion, unless it is specifically indicated otherwise, a software application ("application") is assumed to have one component. In general cases, an application can have more than one component; thus, a "state-aware application" means that at least one component of the application is state-aware.

Figure 2:
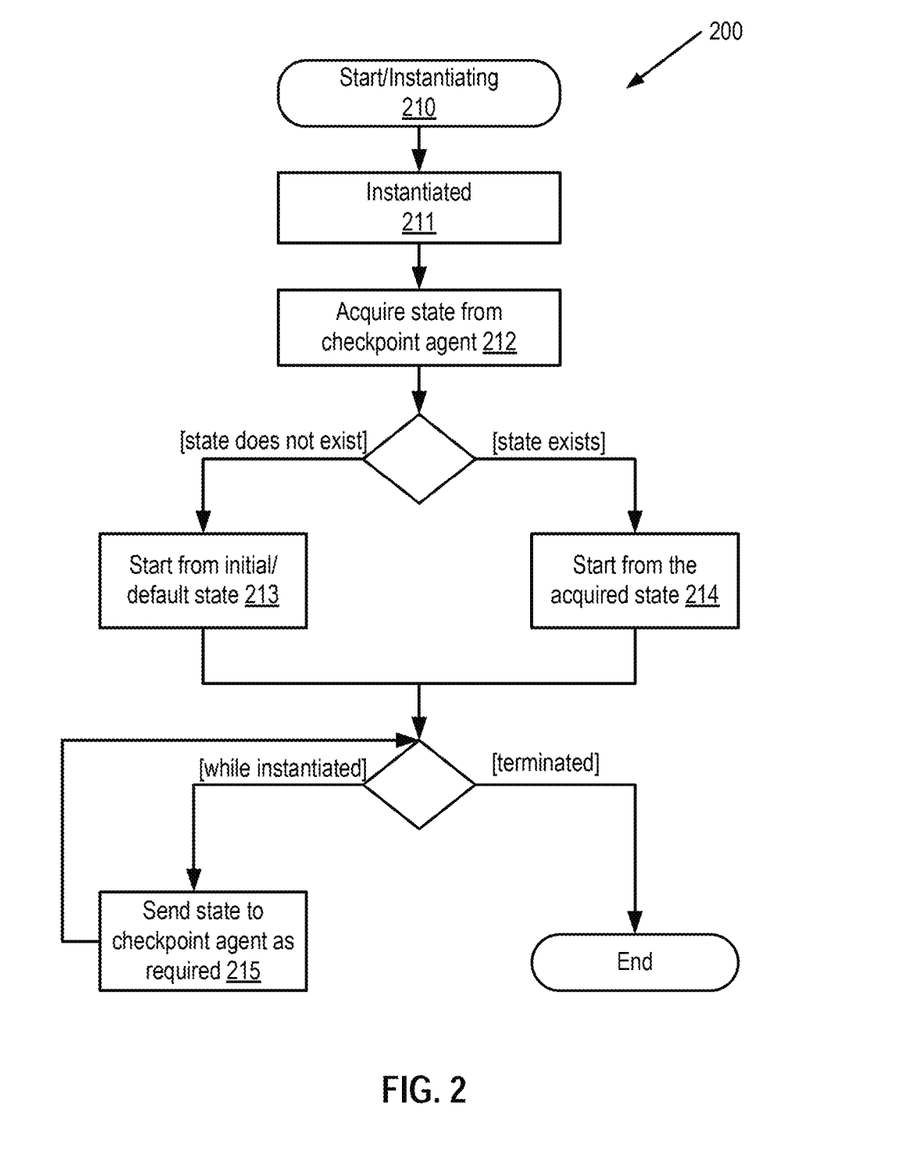
FIG. 2 illustrates a method performed by a state-aware application according to one embodiment.

FIG. 2 illustrates a method 200 performed by a state-aware application according to one embodiment. Upon instantiation (blocks 210-211), the state-aware application acquires its last saved state from a checkpoint agent (block 212). If such a state does not exist, then the application starts from an initial or default state (block 213); otherwise the application continues executing from the last saved state (block 214). What constitutes a state or data type to be saved depends on the particular applications. Therefore, the state can be synchronous or asynchronous. For instance, if the application is media streaming, then an example of its current state may be the address of the media and the current position of the stream. As long as the application is instantiated, it may send its state to the checkpoint agent (block 215). The method 200 ends when the application terminates.

Figure 3:
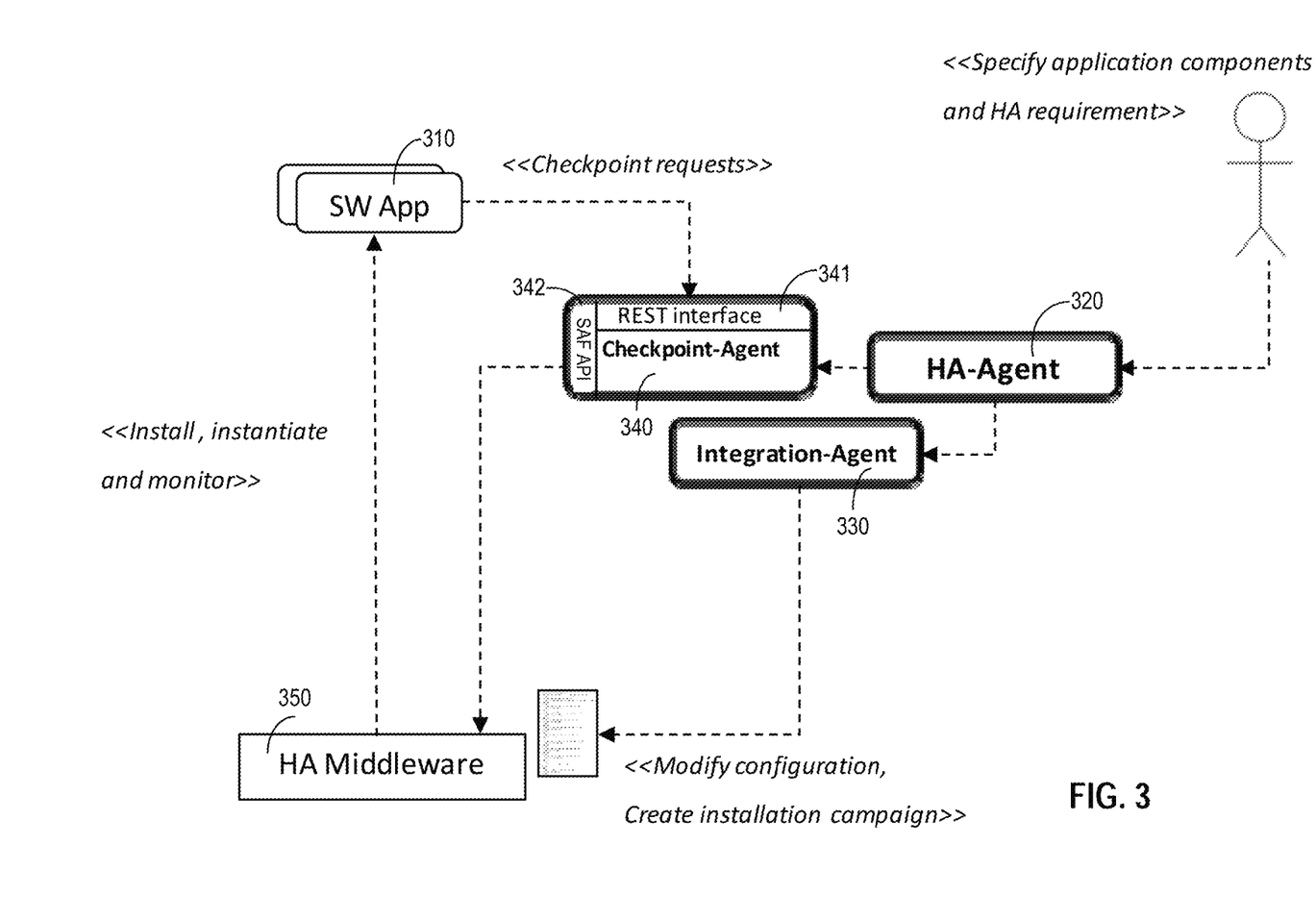
FIG. 3 illustrates a schematic diagram of a system for providing high availability and service continuity to a state-aware application according to one embodiment.

Now turning to FIG. 3, which illustrates a schematic diagram of a system for providing high availability and service continuity to a state-aware application according to an embodiment. This system comprises a state-aware application 310 (shown in FIG. 3 as a software (SW) application), an HA agent 320, an integration agent 330, a checkpoint agent 340 and an HA middleware 350. The state-aware application 310 communicates with the checkpoint-agent 340 through a first interface, and the checkpoint-agent 340 communicates with the HA middleware 350 through a second interface. The system can have multiple state-aware applications at any given point in time. This number can change dynamically with time and based on the need.

A system integrator/user interacts directly with the HA agent 320. As used herein, the term "user" may refer to a cloud user, a system administrator/integrator, or who wishes to use an application in a high-availability manner. In some scenarios, a "user" may be a software provider or designer. The user will provide basic information such as the scripts (or commands) to instantiate/cleanup its application, as well as the redundancy model according to which the HA middleware 350 will protect the application. The user can also specify the installation scripts (or commands), which allows the HA middleware 350 within the Software Management Framework (SMF) to automatically deploy the application on several nodes without the user's intervention. In one embodiment, the user may specify application components and HA requirements/policies as input to the HA agent 320. The application components may be specified in an Entity Types File (ETF), or using a high-level software description which can be transformed into an ETF. In one embodiment, the high-level software description may be in a modeling language such as the Unified Modeling Language (UML) with extended constructs, also referred to as an extended UML component diagram. The extended UML component diagram will be described later with reference to FIG. 7 and FIG. 8.

In one embodiment, the HA agent 320 is responsible for selecting the proper checkpoint agents for an application. In a scenario where the application has multiple components, these components may be assigned the same or different checkpoint agents. In addition, in a cloud environment, the HA agent 320 is also responsible for calculating the needed number of virtual machines (VMs), and selecting the placement of applications' components in the VMs.

In one embodiment, the integration agent 330 accepts the user input via the HA agent 320, in addition to the results of the decisions made by the HA agent 320. Moreover, in some embodiments, the integration agent 330 is responsible for: (1) generating an ETF and configuration requirements, both of which serve as input to the AMF configuration generation; and (2) generating installation campaigns and removal campaigns of the application to be added. The generated AMF configuration can be used to modify the current configuration of the HA middleware 350 to incorporate the newly added application into the current middleware configuration.

The checkpoint agent 340 is responsible for managing the state of the state-aware application 310. An application's component can only use the checkpoint agent 340 if the application has been authenticated to do so; otherwise the checkpoint agent 340 will ignore the application's requests. In one embodiment, the checkpoint agent 340 has a first interface and a second interface, which are different from each other. The first interface allows the checkpoint agent 340 to interact with the state-aware application 310. Through this first interface, the checkpoint agent 340 receives a state from the state-aware application 310 for storing purposes, and may also receive checkpoint requests from the state-aware application 310 for retrieving the saved state. The first interface uses a simple and generic protocol; as an example, the first interface can implement a Representational State Transfer (REST) interface 341. The second interface allows the checkpoint agent 340 to interact with the HA middleware 350 and use the middleware's checkpoint service to save the state from the state-aware application 310. To do so, the second interface implements the API of the middleware 350 (e.g., the SAF API 342).

From the middleware's perspective, the state-aware application 310 appears to be a non-proxied and non-SA-aware (non-service-availability-aware) application, where non-proxied means that the middleware interacts with the application directly without a proxy, and non-SA-aware means that the application does not implement the SAF API. The checkpoint agent 340 appears to be an SA-aware application, where an SA-aware application is an application that implements the SAF API.

When detecting a failure of the state-aware application 310, the middleware 350 re-instantiates the application 310. After re-instantiation, the state-aware application 310 requests for the state saved in the middleware 350 through the checkpoint agent 340, the state allowing the state-aware application 310 to have service continuity. It should be noted that by re-instantiation, it means that the application 310 can be restarted or that the application (or a spare application) can be re-instantiated on another node.

It should be noted that the lack of checkpointing (in case the checkpoint is done in a periodic manner) can indicate an internal failure or malfunction of the state-aware application 310 that is not necessarily detected by the middleware 350 passive monitoring (i.e., monitoring an application without involving the application in reporting its health state; in other words, the application has a passive role in the monitoring process). Therefore, the checkpoint agent 340 can detect and report this failure to the middleware 350 through an API, notifying it that a recovery is needed for the state-aware application 310.

The REST interface 341 does not define an API, but rather it is an architectural style that defines a client-server communication. From this perspective, the state-aware application 310 would be the client and the checkpoint agent 340 would be the server. The REST interface 341 is widely known by programmers, and already used by the majority of web-based applications. REST is agnostic of the programming language used to develop the application. Thus, it allows the server-client communication in a generic way since it uses Unified Resource Identifiers (URIs). Moreover, REST allows location transparency, where the client does not need to know the physical address of the server. This also allows for replicating checkpoint agents across the cluster, and use virtual addressing solutions (e.g., virtual IP) to access the agents. By so doing, failures of the checkpoint agent 340 can be tolerated, since other checkpoint agents can resume the same task.

In an embodiment that uses REST in the context of Hypertext Transfer Protocol (HTTP), a handful of methods (e.g., Get, Put, Delete, etc.) can be used for the communication between the client (state-aware application 310) and the server (checkpoint agent 340). For example, the state-aware application 310 can acquire its state using the method GET with a URI (or an ID) of the resource representing this state. A resource could be a file, or an object, or any other representation of the state. In response, the checkpoint agent 340 returns this resource to the state-aware application 310. After the state-aware application 310 obtains its last saved state, it uses the method PUT to give its subsequent states to the checkpoint agent 340. The PUT method comprises the state and the ID of the resource representing the state. It should be noted that other protocols for communication between the state-aware application 310 and the checkpoint agent 340 can be used.

Thus, the state-aware application 310 without implementing the SAF APIs can be highly available, as its state can be saved and restored in case of failure through the checkpoint agent 340 and the REST interface 341. Meanwhile, the HA middleware 350 maintains its direct control over lifecycle management of the applications. The HA middleware 350 can directly install, instantiate and monitor the state-aware application 310 without the application implementing an SAF API. The direct control of the HA middleware 350 is unidirectional; i.e., the application 310 is not aware of the existence of the middleware 350, but the middleware 350 knows how to install, start/stop and monitor the application 310. The install and instantiate can be performed by the middleware 350 through scripts and not APIs. As for the monitoring, the middleware 350 performs a passive monitoring in collaboration with the operating system (or potentially another component) without the involvement of the state-aware application 310 in reporting its health state.

Although not shown in the embodiment of FIG. 3, in some alternative embodiments the checkpoint agent 340 has a third interface to a database using a database connection. In these alternative embodiments, the checkpoint agent 340 has the option of storing the state of the application 310 as a record (or object) in the database, or as an object in the checkpoint service of the HA middleware 350. The decision on where to store the state may be based on user preferences or other factors such as current workload; e.g., the checkpoint agent 240 can chose to put more load of saving/retrieving the state on the database and less load on the middleware, or vice versa. Thus, in one embodiment, a computer system that performs the method of the checkpoint agent 340 may allocate a first portion of workload of the checkpoint service on the database for saving and retrieving the state of a software application, and allocate a second portion of workload of the checkpoint service on the middleware for saving and retrieving the state of the software application.

Figure 4:
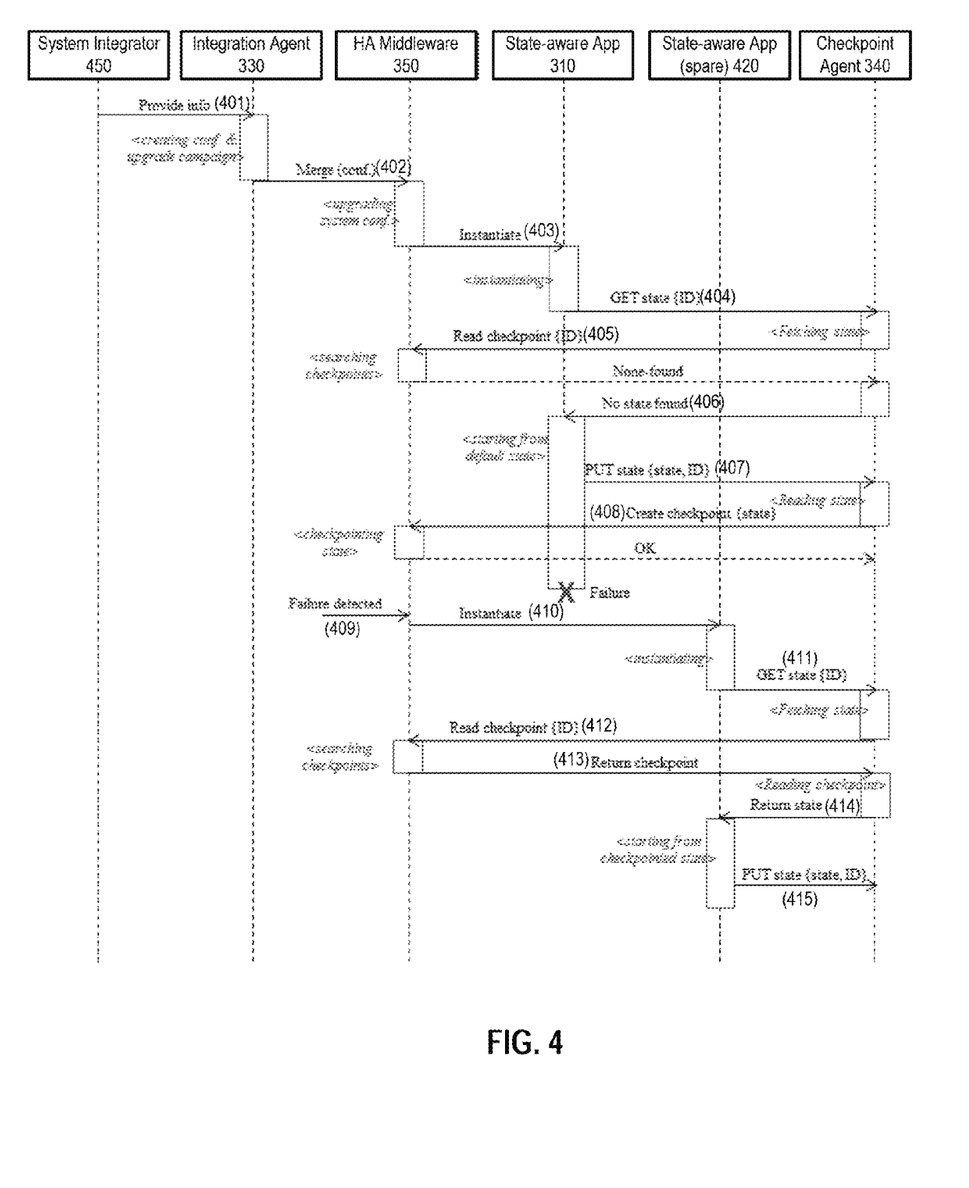
FIG. 4 is a message diagram illustrating an example of the method of FIG. 2 for providing service continuity according to one embodiment.

FIG. 4 is a message diagram illustrating a more detailed example of the method 200 of FIG. 2 for providing service continuity according to one embodiment. The message exchanges in the diagram start with a system integrator/user 450 providing (401) basic information about a state-aware application and its availability requirements to the integration agent 330 (via the HA agent 320 of FIG. 3). The integration agent 330 processes this information and produces an AMF configuration for the application 310 to be merged (402) with the running system configuration. Thereafter, the integration agent 330 creates an upgrade campaign that reflects the addition of the application 310, which is then fed to the middleware 350. The upgrade campaign modifies the middleware configuration by extending it to include the configuration for the added application 310. The middleware 350 then realizes that there is a new state-aware application 310; therefore, it deploys the application 310 and instantiates (403) it with the proper arguments; e.g., by specifying in the configuration file a checkpoint agent 340 assigned to the application 310. After being instantiated, the application 310 tries to acquire (404) its last saved state, by using a generic REST interface to communicate with the assigned checkpoint agent 340. In the request (GET), the application 310 tries to acquire its last saved state from the checkpoint agent 340 in the system. If this is an initial instantiation, then such a state does not exist. More specifically, the checkpoint agent 340 sends (405) a message to the middleware 350 using the second interface with the API of the middleware 350 to search for checkpoints associated with the ID of the checkpoint object representing the state. The middleware 350 sends back (406) a message to the checkpoint agent 340 to indicate that no state matching this ID can be found. The checkpoint agent 340 relays this information back to the application 310, which then starts executing from a default state. Subsequently, the application 310 starts checkpointing its state, again using the REST interface. More specifically, the state-aware application 310 sends a PUT method (407) to the checkpoint agent 340 with the state and the ID of the resource representing the state as parameters. Upon receipt of the state, the checkpoint agent 340 sends the state to the middleware 350 to checkpoint (408) this state using the middleware checkpoint service. This can happen on a regular basis for synchronous applications such as video streaming, or it can happen based on a particular event.

In case of a failure of the application, the middleware 350 can detect (409) it, and react to it. The recovery could be a restart of the application 310 or a failover to a spare/redundant application 420. In a scenario where the application 310 has multiple components and one component fails, the recovery could be a restart of the failed component or a failover to a spare/redundant component. In the following, as an example, the recovery uses the spare application 420. After detection of the failure, the middleware 350 directly communicates with the spare application 420 for instantiating (410) the application 420 on a different cluster node, for example. After instantiation, the spare application 420, being a state-aware application, wants to acquire its state. To do so, the application 420 sends a GET method (411) to the first interface of the checkpoint agent 340. Upon receipt of the request, the checkpoint agent 340 communicates with the middleware 350 using the API to retrieve (412) a previous state of the application 310 before the application 310 failed. The middleware 350 searches in its checkpoint objects for one that has name that is associated (or identical, depending on how the checkpoint agent is implemented to store the state) with the ID of the resource. Once the middleware 350 finds the associated state, it returns (413) it to the checkpoint agent 340, which then returns (414) it to the application 420. The application 420 can start from the previous state that was saved in the middleware 350, instead of the default state. Subsequently, the application 420 can save (415) its state in the middleware 350 as it was the case with the application 310.

It should be noted that the embodiments of the invention may be used in a cloud environment for providing high availability and continuity of the services. In that case, the system integrator would be a cloud user, for example.

The embodiments of the present invention are scalable. Not only the applications can be added or removed on demand, the checkpoint agents can also be added or removed on demand during runtime of the highly available system. This is because the checkpoint agents are generic so their assignments to the applications do not have to be fixed, as any checkpoint agent can take over the role of its peer. In other words, the checkpoint agents are elastic and, depending on the demand, more checkpoint agents can be added to accommodate the requests of the added state-aware applications. When the demand diminishes, the added checkpoint agents can be removed. This leads to offer high availability as a service for cloud users. For instance, not all applications in the cloud need to be highly available around the clock. Certain applications perform critical computation at certain hours; e.g., applications analyzing the stock market based on data-mining typically perform the analysis after the market trading hours, and therefore only need to be instantiated and highly available during specific hours. Other applications, potentially running on the same VMs, may need high availability at different hours. In one embodiment, the demand is based on policies defined by a user of the application, where the policies specify triggers for providing high availability to the application. For example, the triggers may be defined in terms of traffic thresholds, time of day, or other factors.

In order to offer this high availability on demand, applications can be added or removed through an upgrade campaign that automatically adds or removes the applications from the middleware information model (without necessarily un-installing the application, unless it is needed to save resources). In short, upgrade campaigns can be scheduled in a timely manner, where the cloud user simply needs to specify the time/event which he needs his applications to be instantiated to have high availability.

In one embodiment, a cloud management system may include an HA module, which further includes an HA agent, an integration agent and one or more checkpoint agents. A user can interact with the HA module to add or remove the applications that he/she wishes to deploy in the cloud environment on demand. In one embodiment, the added applications do not need to implement the SAF APIs to become highly available on demand.

Figure 5:
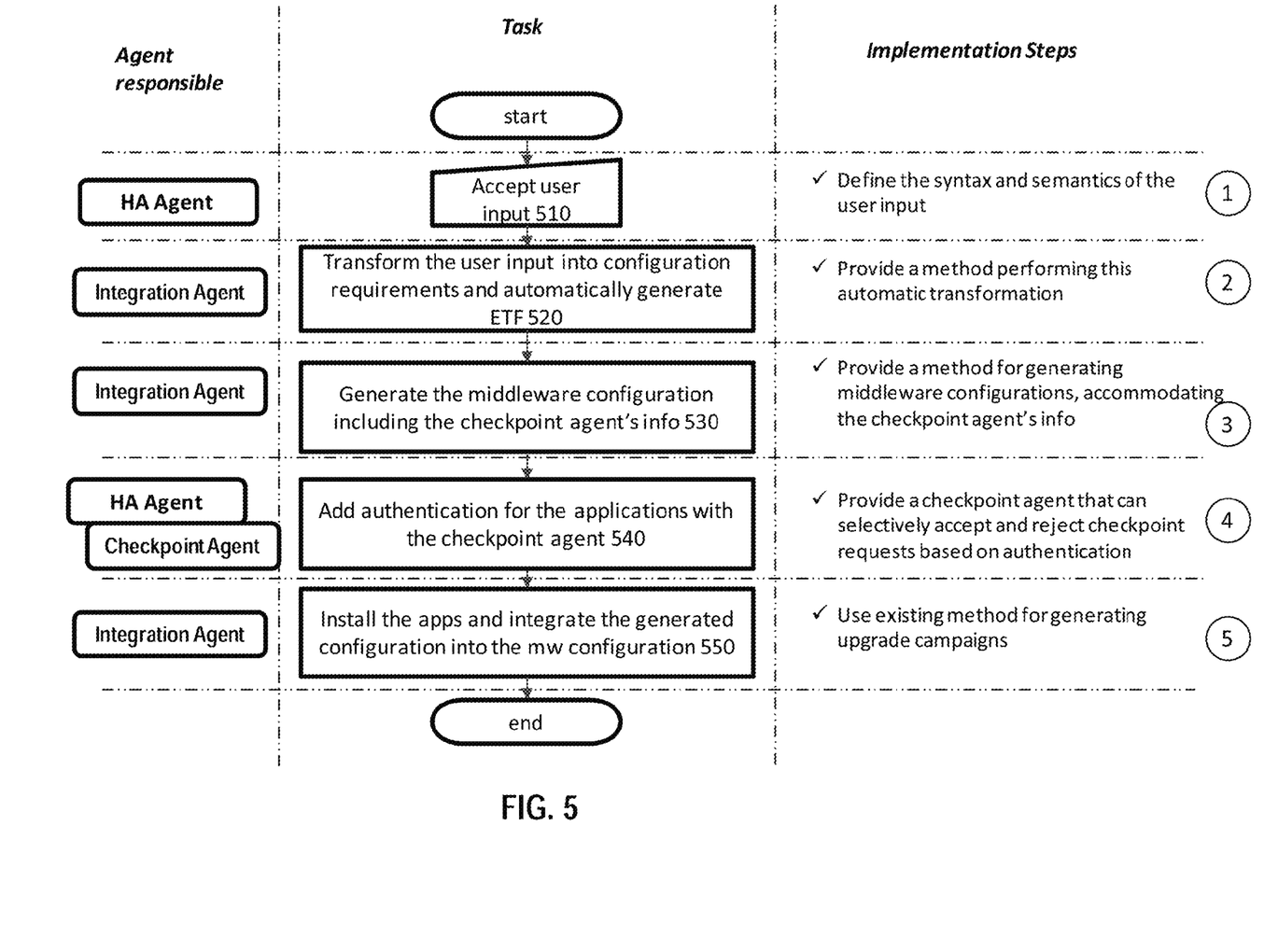
FIG. 5 is a diagram illustrating a process for adding an application on demand according to one embodiment.

FIG. 5 illustrates a process for adding an application and making it HA on demand according to one embodiment. The process enables the automatic deployment of applications, monitors their health, manages their recovery, and offers them a checkpoint facility that does not require any middleware APIs implementation. The same process can be applied to stateless and state-aware applications, except that stateless applications do not need checkpoint services and therefore no checkpoint agents will be assigned to stateless applications.

In the embodiment of FIG. 5, in the leftmost column under "agent responsible" is a list of agents responsible for the task listed in the middle column. In the rightmost column is the method/implementation to enable the task to be performed. The lists of tasks are shown to include five main tasks, which will be explained in detail as follows.

Task 1 is to accept user input (510). The HA agent accepts the user input that describes an application and the HA requirements. Each application may have a different organization, architecture and HA requirements; therefore, a generic model is needed that defines syntax and semantics for the users to describe their applications and the HA requirements. One embodiment of this genetic model is an extended UML component diagram, which will be described in detail with reference to FIG. 7 and FIG. 8.

Task 2 is to transform the user input into configuration requirements and automatically generate an ETF (520). The integration agent automatically transforms the user input into the input of a configuration generator. The input to the configuration generator includes configuration requirements and one or more ETF files.

Task 3 is to generate the middleware configuration including information of checkpoint agents (530). The configuration generator automatically generates a middleware configuration based on its input. In one embodiment, the generated middleware configuration identifies a checkpoint agent which is selected to maintain the state of a state-aware application. The selection of the checkpoint agent can be based on criteria specified by the application according to its needs. For example, if applications (App1 and App2) in node1 require fast checkpoint retrieval, then checkpoint agent C1 can be collocated with App1 and App2 in node1. If another application (App3) in node2 does not require fast checkpoint retrieval, then checkpoint agent C1 can be assigned to also handle the requests of App3 as well. When selecting a checkpoint agent for a state-aware application, the factors to be considered include such as checkpoint frequency, data size per checkpoint, network latency, etc., and the factors may be weighed based on given preferences. Note that the checkpoint agent is a stateless component that can be replicated without the application being made aware of it. Thus, in one embodiment, multiple checkpoint agents may be hidden behind a load balancer to scale up the capacity for handling higher frequencies of checkpoint requests.

In one embodiment, the checkpoint agent may be identified by information such as its domain name or address. This information, as well as additional information such as the path to the resources that the application can access and manipulate (to save/retrieve its state using the REST methods), may be included in a command's arguments directed to the state-aware application, such as the instantiate command. This means that, upon instantiation, the state-aware application will be given the information that identifies a checkpoint agent assigned to it. To ensure the service continuity in case of a checkpoint agent failure, multiple checkpoint agents can have the same virtual-address and therefore handle checkpoint requests for the same state-aware application.

Task 4 is to add authentication for the application to authenticate with the assigned checkpoint agent(s) (540). As mentioned before, an application's component can only use a checkpoint agent if the application has been authenticated to do so; otherwise the checkpoint agent will ignore (reject) the application's requests.

Task 5 is to install the application and integrate the generated configuration into the current middleware configuration (550). In one embodiment, the generated middleware configuration is fed into an upgrade campaign generator to generate an upgrade campaign file. This upgrade campaign file may be used by SMF to install the application and modify the middleware configuration to include the generated configuration. In one embodiment, after the application is installed, the generated configuration may be merged with the existing middleware configuration.

When a state-aware application is removed from the middleware configuration (e.g., due to diminished demand), the middleware stops passively monitoring the application, and removes the application information from the middleware configuration. The HA agent also instructs the checkpoint agent to stop accepting checkpoint requests from the application.

Figure 6:
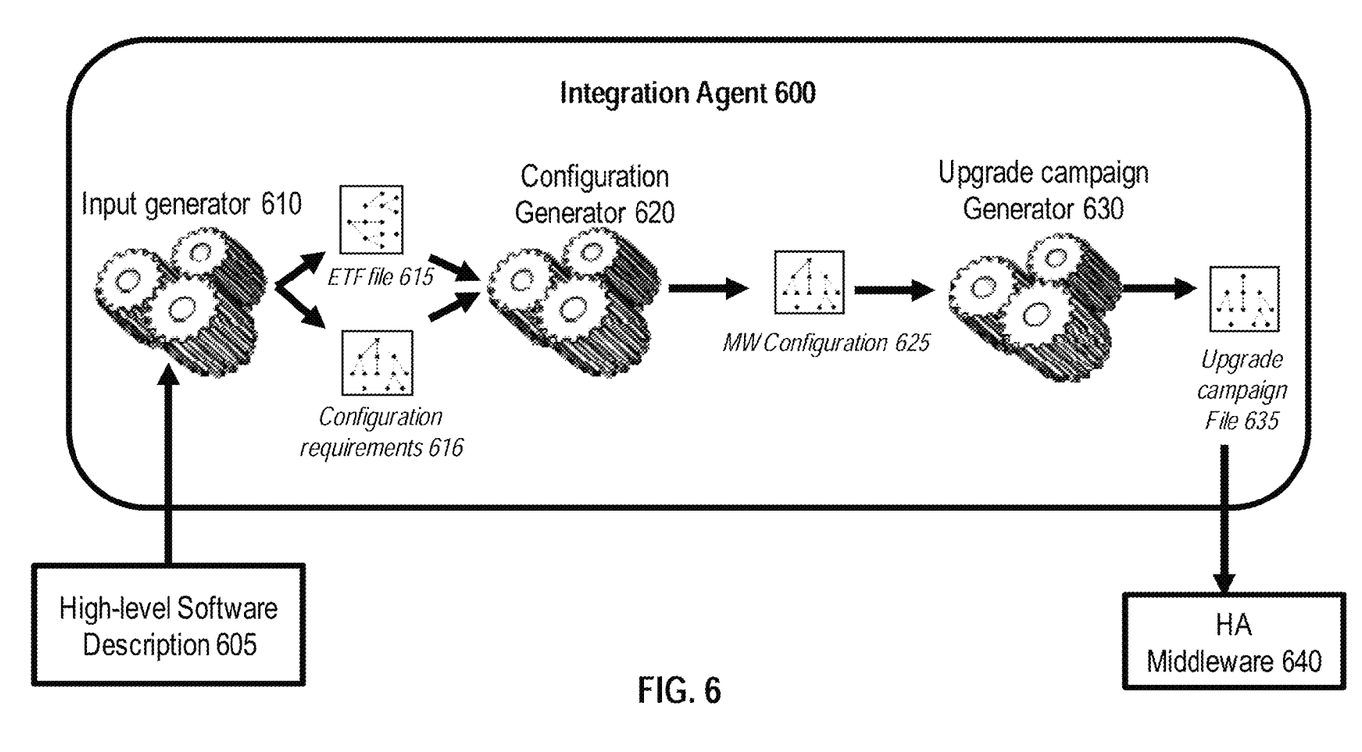
FIG. 6 illustrates an example of an integration agent according to one embodiment.

FIG. 6 illustrates an example of an integration agent 600 according to one embodiment of the invention. In this embodiment, the integration agent 600 includes an input generator 610, a configuration generator 620 and an upgrade campaign generator 630. The input generator 610 receives a high-level software description 605, which describes a software application to be added to a highly available system. From the software description 605, the input generator 610 generates an ETF file 615 and configuration requirements 616. The configuration generator 620 receives the ETF file 615 and the configuration requirements 616, and generates a middleware configuration 625 (e.g., a SAF middleware configuration such as an AMF configuration). An example of the configuration generator 620 is described in U.S. Pat. No. 8,006,130, "Methods and Systems for Generating Availability Management Framework (AMF) Configurations" by Kanso et al. In the embodiment of FIG. 6, the middleware configuration 225 is fed into the upgrade campaign generator 630, which generates an upgrade campaign file 635 using existing methods. An example of the existing method is described in U.S. Pre-Grant Publication 20110035738 A1, "Method for Generating an Upgrade Campaign for a System" by Kohzadi et al.

In the following, the extended UML component diagram is described with reference to FIG. 7 and FIG. 8. The UML is the de-facto modeling language in the software engineering field; it defines a set of graphic notations or diagrams that can visually model the structure and behavior of complex systems. The UML component diagram depicts how the various components of a software system are linked together. A UML component represents a subsystem (e.g., a software entity) that can interact with other system components by providing or consuming services using its interfaces.

In order to enable a user to define an input describing its application using component diagrams, the UML is extended with additional constructs that capture specific semantics in the context of the SAF domain. Thus, these extensions relieve the user from having to learn the SAF specifications, and allow the user remains at a generic level of modeling its application.

Figure 7:
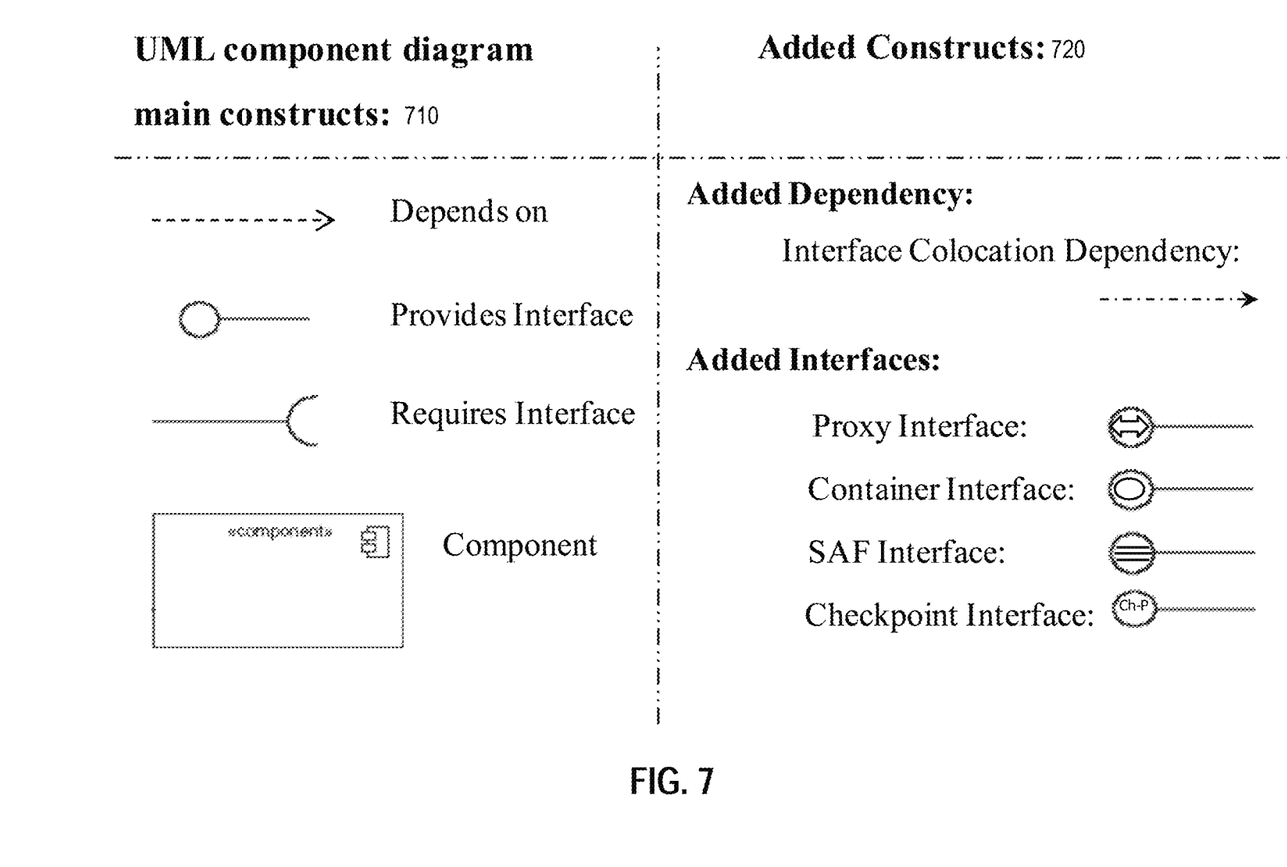
FIG. 7 illustrates added extension to the UML according to one embodiment.

FIG. 7 illustrates an embodiment of added constructs in an extended UML component diagram. The extension adds semantics and domain-specific constructs to the UML, through the use of stereotypes, tag definitions and constraints which are applied to specific model elements such as classes or attributes. In an extended UML component diagram, the added interfaces map to the UML standard interface with added semantics. The extension also adds interface colocation dependency to the UML. The interface colocation dependency also maps to the standard dependency with added semantics. The extension to the UML adds at least constructs 720 to UML component diagram main constructs 710. The constructs 720 include: interface colocation dependency, SAF interface, proxy interface, container interface and checkpoint interface. Additional interfaces and dependency may also be included.

Figure 8:
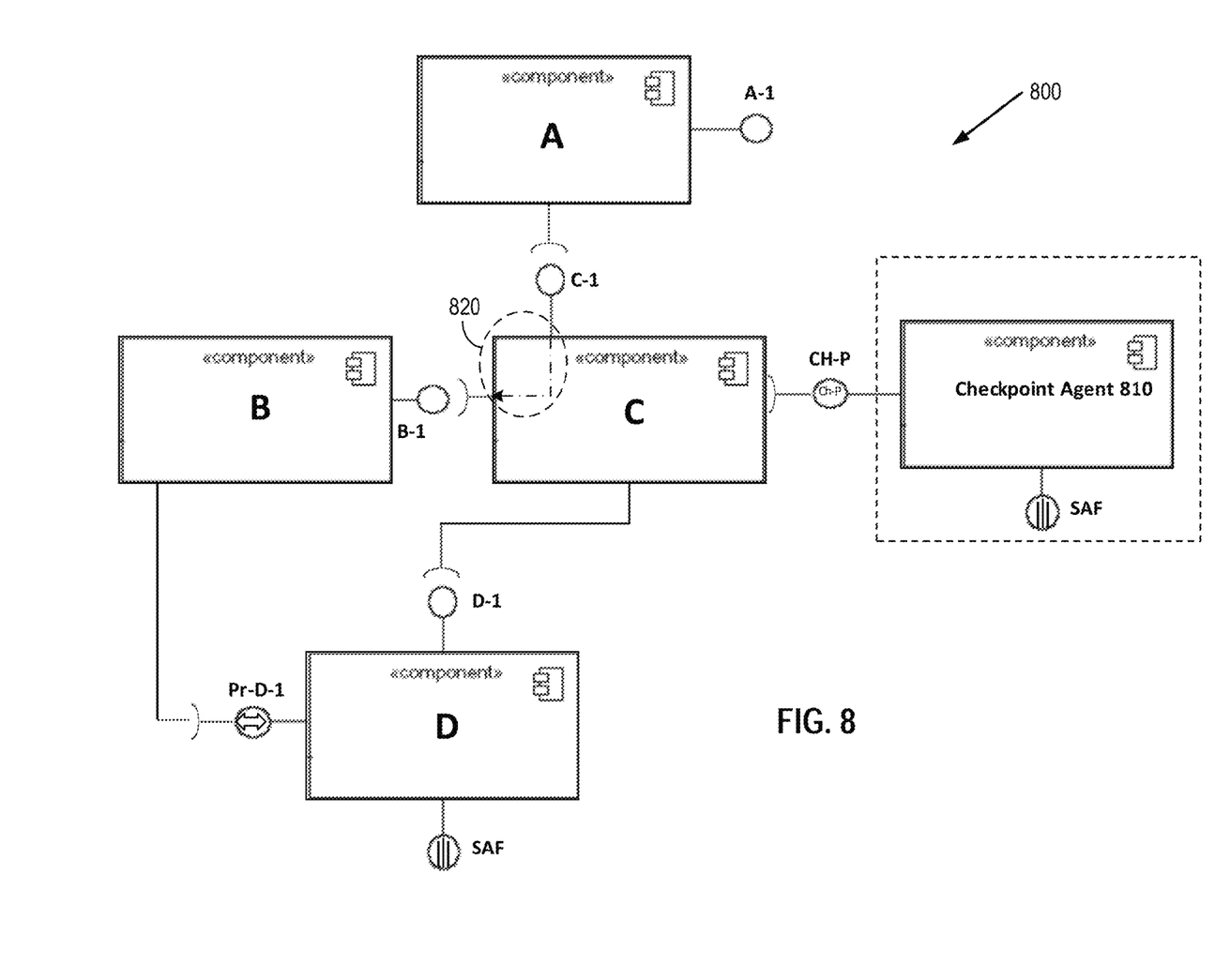
FIG. 8 illustrates an example of a high-level software description based on an extended UML component diagram according to one embodiment.

FIG. 8 illustrates an example of an extended UML component diagram 800 based on the extended UML according one embodiment of the invention. In this example, a designer models its application to include four components (A,B,C,D), where each component provides one or more services through their respective "provides" interfaces (A-1, B1, C-1, D-1). The designer also specifies a set of attributes for each component (e.g., the instantiate/cleanup commands, the number of active/standby/spare instances needed (i.e., redundancy), the preferred resource allocation for the component, etc.). Part of these attributes will be mapped to the ETF file generated based on the component diagram 800; part of the attributes will be used to create the configuration requirements. In this example, an interface colocation dependency 820 exists between components B and C. Component D offers a proxy interface Pr-D-1. A checkpoint agent 810 (shown in a dotted box) provides a checkpoint interface CH-P. Note that the checkpoint agent 810 is not part of the user's application. Rather, the checkpoint agent 810 interfaces with the user's software components (A,B,C,D) to provide service continuity and high availability to the software. The user can specify in the diagram that he/she requires this interface for certain components.

Table 1 illustrates, at a high level of abstraction, an embodiment of a method for generating the ETF file. Alternative embodiments may include variations to the method to accommodate different user preferences. Some of the following steps may be optional; e.g., certain orphan independent component types are not necessarily grouped by service unit types. In some embodiments, service group types and/or application types may be omitted.

TABLE 1

ETF generation method

| Step | Action |
|---|---|
| Creating Component Types (CTs) and Component Service Types (CSTs) | For each UML component create an ETF component type.<br>For each provided interface of the component, create an ETF component service type, and associated with the component type through the <<provides>> relationship.<br>For each interface colocation dependency create a CT-CST dependency. |
| Creating Service Types (SvcTs) | For each set of CTs, connected through the CT-CST dependency, create an ETF service type that groups (i.e. through the <<groups>> relationship) all the CSTs provided by the set of CTs.<br>For each independent CT, create a service type that groups all the CSTs provided by the independent CT. |
| Creating Service Unit Types (SUTs) | For each set of CTs connected through the CT-CST dependency create an ETF service unit type that groups all the CTs implicated in the dependency.<br>For each independent CT, create a service unit type that groups the CT.<br>For each SvcT where all its CSTs are provided by the set of CTs of the SUT, associate the SUT and the SvcT through the <<provides>> relationship.<br>For each provided SvcT (by the SUT) that groups a CST provided by a CT (derived from a UML component) that requires (through the "require" UML interface) an interface from a different CT (derived from a UML component) that provides a CST grouped by a different SvcT, create a SUT-SvcT dependency relationship. |
| Creating Service Group Types (SGTs) | For each SUT, create an ETF service group type that groups it (can be changed based on preferences). |
| Create Application Types | For all the SGTs grouping the user's components, create an ETF application type that groups them (can be changed based on preferences). |
| Create a software bundle | Create an ETF software bundle that the ETF CTs can reference. |

In addition to the ETF generation, a high-level software description can also be used to generate configuration requirements. As shown in the embodiment of FIG. 6, the inputs needed for generating a middleware configuration include: (1) an ETF file, and (2) configuration requirements in terms of templates (e.g., service instance and component service instance templates). Based on the information specified in the component these templates can be generated. As a simplified example, one service-instance is generated per active service-unit, e.g., if, for component D in FIG. 8, the user specifies a redundancy model of 3 active +1 standby, then a service-instance template of 3 service-instances is defined, where each service instance includes one component-service-instance of each CST provided by component D.

Figure 9:
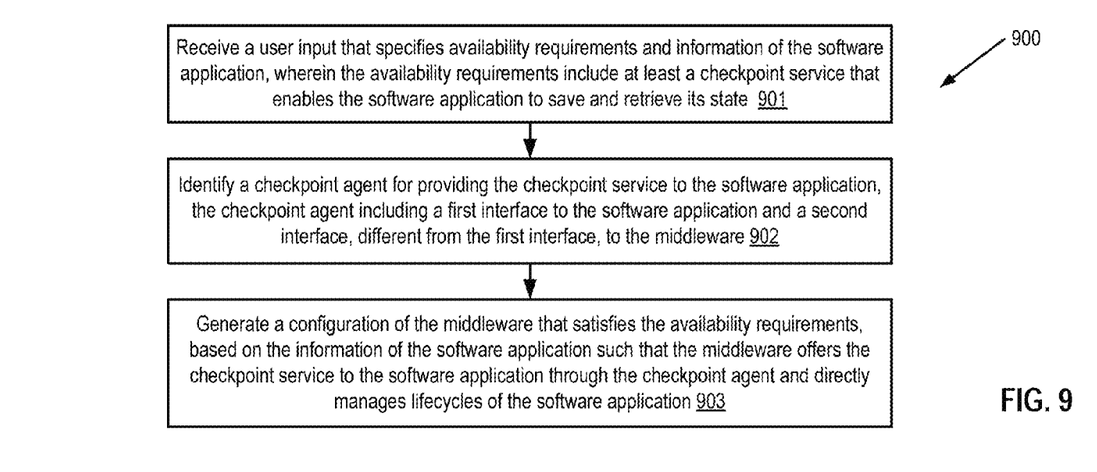
FIG. 9 illustrates a method for automatically configuring a middleware when a software application is added, according one embodiment.

FIG. 9 is a flow diagram illustrating a method 900 for automatically configuring a middleware that manages the high availability of a software application that is to be added to a system (such as a highly available system managed by the middleware). Referring to FIG. 9, in one embodiment, the method 900 begins with receiving a user input that specifies availability requirements and information of the software application, where the availability requirements include at least a checkpoint service that enables the software application to save and retrieve its state (block 901). The method further includes identifying a checkpoint agent for providing the checkpoint service to the software application (block 902). The checkpoint agent includes a first interface to the software application and a second interface, different from the first interface, to the middleware. The method further includes generating a middleware configuration that satisfies the availability requirements, based on the information of the software application such that the middleware offers the checkpoint service to the software application through the checkpoint agent and directly manages lifecycles of the software application (block 903).

The method 900 may be performed by hardware (e.g., circuitry, dedicated logic, programmable logic, microcode, etc.), software (e.g., instructions run on a processing device), or a combination thereof. In one embodiment, the method 900 is performed by a computer system 1000 of FIG. 10. In one embodiment, the computer system 1000 may be part of a network node (e.g., a router, switch, bridge, controller, base station, etc.). In one embodiment, the computer system 1000 may be part of a cloud computing system or cloud management system.

Figure 10:
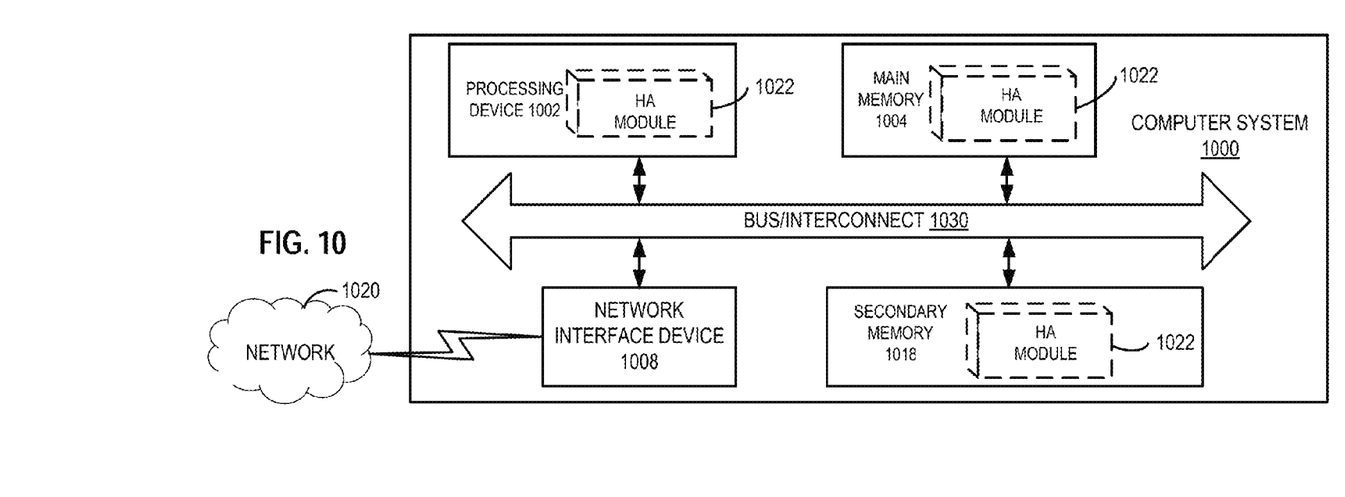
FIG. 10 illustrates a block diagram of a computer system according to one embodiment.

FIG. 10 illustrates a diagrammatic representation of a machine in the exemplary form of the computer system 1000 within which a set of instructions, for causing the machine to perform any one or more of the methodologies discussed herein, may be executed. The computer system 1000 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002. The processing device 1002 represents one or more general-purpose processors, each of which can be: a microprocessor, a central processing unit (CPU), a multicore system, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted to execute the operations of an HA module 1022 which contains instructions executable by the processor device 1002 to perform the method 900 of FIG. 9 for configuring a middleware that manages the high availability of a software application.

In one embodiment, the computer system 1000 is adapted to automatically generate an ETF from a high-level software description, wherein the software description describes software that is to be managed by a middleware to achieve high availability. The computer system 1000 is operative to perform the method 900 of FIG. 9 of receiving a user input that specifies availability requirements and information of the software application, where the availability requirements include at least a checkpoint service that enables the software application to save and retrieve its state; identifying a checkpoint agent for providing the checkpoint service to the software application, wherein the checkpoint agent includes a first interface to the software application and a second interface, different from the first interface, to the middleware; and generating a middleware configuration that satisfies the availability requirements, based on the information of the software application such that the middleware offers the checkpoint service to the software application through the checkpoint agent and directly manages lifecycles of the software application.

In one embodiment, the processor device 1002 is coupled to one or more memory devices such as: a main memory 1004 (e.g., read-only memory (ROM), flash memory, dynamic random access memory (DRAM) such as synchronous DRAM (SDRAM) or Rambus DRAM (RDRAM), etc.), a secondary memory 1018 (e.g., a magnetic data storage device, an optical magnetic data storage device, etc.), and other forms of computer-readable media, which communicate with each other via a bus or interconnect 1030. The memory devices may also include different forms of read-only memories (ROMs), different forms of random access memories (RAMs), static random access memory (SRAM), or any type of media suitable for storing electronic instructions. In one embodiment, the memory devices may store the code and data of the HA module 1022. In the embodiment of FIG. 10, the HA module 1022 may be located in one or more of the locations shown as dotted boxes and labeled by the reference numeral 1022. In alternative embodiments the HA module 1022 may be located in other location(s) not shown in FIG. 10.

The computer system 1000 may further include a network interface device 1008. A part or all of the data and code of the HA module 1022 may be transmitted or received over a network 1020 via the network interface device 1008.

In one embodiment, the HA module 1022 can be implemented using code and data stored and executed on one or more computer systems (e.g., the computer system 1000). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the flow diagram of FIG. 9 have been described with reference to the exemplary embodiment of FIG. 10. However, it should be understood that the operations of the flow diagram of FIG. 9 can be performed by embodiments of the invention other than those discussed with reference to FIG. 10, and the embodiment discussed with reference to FIG. 10 can perform operations different than those discussed with reference to the flow diagram. While the flow diagram of FIG. 9 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for automatically configuring a middleware that manages high availability of a software application to be added to a system, the method comprising the steps of:
   receiving, by a computer system, a user input that specifies availability requirements and information of the software application, wherein the availability requirements include at least a checkpoint service that enables the software application to save and retrieve its state;
   identifying a checkpoint agent for providing the checkpoint service to the software application, wherein the checkpoint agent includes a first interface to the software application and a second interface, different from the first interface, to the middleware; and
   generating a configuration of the middleware that satisfies the availability requirements, based on the information of the software application such that the middleware offers the checkpoint service to the software application through the checkpoint agent and directly manages lifecycles of the software application.

2. The method of claim 1, wherein the information of the software application is a high-level software description, the method further comprising the step of:
   automatically generating an Entity Types File (ETF) from the high-level software description, wherein the high-level software description describes components of the software application and relationship of the components, and wherein the ETF describes a hierarchy of entity types compliant with middleware specifications.

3. The method of claim 1, wherein the first interface of the checkpoint agent is a Representational State Transfer (REST) interface.

4. The method of claim 1, further comprising the steps of:
   receiving from the software application, by the checkpoint agent, a state associated with a resource identifier from the software application via the first interface; and
   sending, by the checkpoint agent, the state associated with the resource identifier to the middleware via the second interface for storing by the middleware.

5. The method of claim 1, wherein the checkpoint agent has a third interface connecting to a database, the method further comprising the step of:
   allocating a first portion of workload of the checkpoint service on the database for saving and retrieving the state of the software application; and
   allocating a second portion of workload of the checkpoint service on the middleware for saving and retrieving the state of the software application.

6. The method of claim 1, wherein the middleware directly manages the software application to install, instantiate and monitor the software applications without the software application implementing an Application Programming Interface (API) compliant to the middleware specifications.

7. The method of claim 1, further comprising the steps of:
   adding or removing one or more checkpoint agents on demand during runtime of the system.

8. The method of claim 1, further comprising the step of:
   selecting the checkpoint agent based, at least in part, on criteria specified by the software application.

9. The method of claim 1, wherein the software application is added and removed on demand during runtime of the system.

10. The method of claim 9, wherein the demand is based on policies defined by a user of the software application, wherein the policies specify triggers for providing high availability to the software application.

11. A computer system adapted to automatically configure a middleware that manages high availability of a software application to be added to a system, the computer system comprising a processor and a memory, the memory containing instructions executable by the processor, wherein the computer system is operative to:
    receive a user input that specifies availability requirements and information of the software application, wherein the availability requirements include at least a checkpoint service that enables the software application to save and retrieve its state;
    identify a checkpoint agent for providing the checkpoint service to the software application, wherein the checkpoint agent includes a first interface to the software application and a second interface, different from the first interface, to the middleware; and
    generate a configuration of the middleware that satisfies the availability requirements, based on the information of the software application the middleware such that the middleware offers the checkpoint service to the software application through the checkpoint agent and directly manages lifecycles of the software application.

12. The computer system of claim 11, wherein the information of the software application is a high-level software description, the computer system is further operative to:
    automatically generate an Entity Types File (ETF) from the high-level software description, wherein the high-level software description describes components of the software application and relationship of the components, and wherein the ETF describes a hierarchy of entity types compliant with middleware specifications.

13. The computer system of claim 11, wherein the first interface of the checkpoint agent is a Representational State Transfer (REST) interface.

14. The computer system of claim 11, wherein the computer system is further operative to:
    receive from the software application, by the checkpoint agent, a state associated with a resource identifier from the software application via the first interface; and
    send, by the checkpoint agent, the state associated with the resource identifier to the middleware via the second interface for storing by the middleware.

15. The computer system of claim 11, wherein the checkpoint agent has a third interface to a database, the computer system being further operative to:
    allocate a first portion of workload of the checkpoint service on the database for saving and retrieving the state of the software application; and
    allocate a second portion of workload of the checkpoint service on the middleware for saving and retrieving the state of the software application.

16. The computer system of claim 11, wherein the middleware directly manages the software application to install, instantiate and monitor the software applications without the software application implementing an Application Programming Interface (API) compliant to middleware specifications.

17. The computer system of claim 11, wherein one or more checkpoint agents are added and removed on demand during runtime of the system.

18. The computer system of claim 11, wherein the computer system is further operative to select the checkpoint agent based, at least in part, on criteria specified by the software application.

19. The computer system of claim 11, wherein the software application is added and removed on demand during runtime of the system.

20. The computer system of claim 19, wherein the demand is based on policies defined by a user of the software application, wherein the policies specify triggers for providing high availability to the software application.

* * * * *